United States Patent
Yoshizaki et al.

(10) Patent No.: US 10,260,453 B2
(45) Date of Patent: Apr. 16, 2019

(54) TWO-CYCLE ENGINE AND ENGINE WORK MACHINE

(71) Applicant: HITACHI KOKI CO., LTD., Tokyo (JP)

(72) Inventors: Yosuke Yoshizaki, Ibaraki (JP); Naoto Ichihashi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 64 days.

(21) Appl. No.: 15/504,019

(22) PCT Filed: Aug. 21, 2015

(86) PCT No.: PCT/JP2015/073536
§ 371 (c)(1),
(2) Date: Feb. 15, 2017

(87) PCT Pub. No.: WO2016/031718
PCT Pub. Date: Mar. 3, 2016

(65) Prior Publication Data
US 2017/0254293 A1    Sep. 7, 2017

(30) Foreign Application Priority Data
Aug. 29, 2014 (JP) .................. 2014-175811

(51) Int. Cl.
*F02B 33/04*        (2006.01)
*F02F 3/24*         (2006.01)
(Continued)

(52) U.S. Cl.
CPC ............... *F02F 3/24* (2013.01); *A01D 34/68* (2013.01); *A01D 34/6806* (2013.01);
(Continued)

(58) Field of Classification Search
CPC ..... F02F 3/24; F02F 1/22; F02B 63/02; F02B 75/02; F02B 2075/025; A01D 34/6806; A01D 34/412; A01D 2101/00
(Continued)

(56) References Cited

U.S. PATENT DOCUMENTS

| 4,062,331 A | 12/1977 | Boyeson |
| 4,202,298 A | 5/1980 | Boyesen |

(Continued)

FOREIGN PATENT DOCUMENTS

| DE | 19715947 | 11/1997 |
| JP | S57140519 | 8/1982 |

(Continued)

OTHER PUBLICATIONS

"International Search Report (Form PCT/ISA/210)", dated Oct. 27, 2015, with English translation thereof, pp. 1-4.
(Continued)

*Primary Examiner* — Marguerite McMahon
(74) *Attorney, Agent, or Firm* — JCIPRNET

(57) ABSTRACT

The disclosure provides a two-cycle engine and an engine work machine. When a piston is located on the side of a bottom dead center, at a part corresponding to a notch part in the piston, an inner surface of the crank case protrudes toward an interior side to form a crank case first protruding part penetrating through the notch part toward the interior side. Meanwhile, the crank case at a part corresponding to a part without the notch part in the piston is not in a shape protruding toward the interior side. By assembling the piston and the crank case in such shapes, the piston is able to reciprocally move up and down without interfering with the crank case. In this case, by disposing the crank case first protruding part, the volume in the crank case is able to be reduced.

10 Claims, 5 Drawing Sheets

(51) Int. Cl.

| | | |
|---|---|---|
| *A01D 34/68* | (2006.01) | |
| *F02F 1/22* | (2006.01) | |
| *F02B 25/16* | (2006.01) | |
| *F02B 63/02* | (2006.01) | |
| *F16J 1/09* | (2006.01) | |
| *F02B 75/02* | (2006.01) | |
| *F02B 25/14* | (2006.01) | |
| *A01D 34/412* | (2006.01) | |
| *A01D 101/00* | (2006.01) | |

(52) U.S. Cl.
CPC .............. *F02B 25/14* (2013.01); *F02B 25/16* (2013.01); *F02B 63/02* (2013.01); *F02B 75/02* (2013.01); *F02F 1/22* (2013.01); *F16J 1/09* (2013.01); *A01D 34/412* (2013.01); *A01D 2101/00* (2013.01); *F02B 2075/025* (2013.01)

(58) Field of Classification Search
USPC ................... 123/73 A, 73 FA, 73 PP, 74 AP
See application file for complete search history.

(56) References Cited

U.S. PATENT DOCUMENTS

| 4,340,016 A | * | 7/1982 | Ehrlich | ................... | F02B 25/14 |
| | | | | | 123/65 A |
| 4,388,895 A | * | 6/1983 | Boyesen | ................ | F01L 3/205 |
| | | | | | 123/73 A |
| 6,142,113 A | | 11/2000 | Mochizuka et al. | | |
| 2006/0266310 A1 | * | 11/2006 | Yamaguchi | ............. | F02B 25/14 |
| | | | | | 123/73 PP |
| 2008/0302344 A1 | * | 12/2008 | Kunert | ................... | F02B 25/14 |
| | | | | | 123/73 PP |
| 2010/0326412 A1 | * | 12/2010 | Zwimpfer | ................ | F02D 9/16 |
| | | | | | 123/65 R |
| 2012/0006308 A1 | * | 1/2012 | Mavinahally | ........... | F02B 25/06 |
| | | | | | 123/73 PP |
| 2012/0060806 A1 | * | 3/2012 | Kunert | ................... | F02B 25/14 |
| | | | | | 123/73 PP |

FOREIGN PATENT DOCUMENTS

| JP | S61103059 | 5/1986 |
| JP | S63120816 | 5/1988 |
| JP | H0622550 | 3/1994 |
| JP | H1018848 | 1/1998 |
| JP | 2000170538 | 6/2000 |
| JP | 2001082153 | 3/2001 |
| JP | 2001173447 | 6/2001 |
| JP | 2007239509 | 9/2007 |
| JP | 2015021492 | 2/2015 |

OTHER PUBLICATIONS

"Search Report of Europe Counterpart Application", dated Feb. 12, 2018, p. 1-p. 6, in which the listed references were cited.

"Office Action of Japan Counterpart Application," dated Jun. 19, 2017,with English translation thereof, p. 1-p. 7.

* cited by examiner

TWO-CYCLE ENGINE AND ENGINE WORK MACHINE

CROSS-REFERENCE TO RELATED APPLICATIONS

This application is a 371 of international application of PCT application serial no. PCT/JP2015/073536, filed on Aug. 21, 2015, which claims the priority benefit of Japan application no. 2014-175811, filed on Aug. 29, 2014. The entirety of each of the above-mentioned patent applications is hereby incorporated by reference herein and made a part of this specification.

BACKGROUND OF THE INVENTION

1. Field of the Invention

The invention relates to a structure of a two-cycle engine and an engine work machine using the structure of the two-cycle engine.

2. Description of Related Art

Various engine work machines, such as mowers, blowers, chain saws, power cutters, and the like, which use a small-sized engine as power source are already well-known.

For example, a mower cuts plants with a blade driven by an engine. To operate at a high efficiency, a high output of the engine is required. Besides, since the mower is often carried by an operator when being used, so a lighter weight is required. Therefore, a two-cycle engine having a smaller size, a lighter weight, and a high output is favored as an engine used in the mower.

In the two-cycle engine, a mixed gas mixing a fuel and air is guided into a combustion chamber formed in a cylinder, and after being compressed through elevation of a piston, the compressed mixed gas is ignited and exploded. Here, when the piston elevates to perform compression in the combustion chamber, a new mixed gas is sucked into a crank case on a lower side of the piston. When the piston descends due to the explosion, the new mixed gas accumulating in the crank case is compressed (single stage compression), and is guided into the combustion chamber again through a scavenging passage. Accordingly, a following operation is repetitively performed in the combustion chamber: a new mixed gas is guided in at the same time when a waste gas after combustion is discharged (scavenging), and the piston elevates again.

To increase an output of the two-cycle engine, it is effective to increase a scavenging efficiency, namely guiding the new mixed gas into the combustion chamber at a high efficiency, and discharging the waste gas at a high efficiency. In order to increase the scavenging efficiency, it is effective to increase a single stage compression ratio to send more mixed gas into the combustion chamber, and a structure with a crank case having a smaller volume is effective to increase the single stage compression ratio.

For example, Patent Literature 1 recites a two-cycle engine structure as follows. The two-cycle engine structure increases the scavenging efficiency by designing an internal structure of the crank case or a structure of the scavenging passage.

PRIOR ART LITERATURE

Patent Literature

Patent Literature 1: Japanese Patent Publication No. 2000-170538

SUMMARY OF THE INVENTION

Problem to be Solved

However, to design an internal structure of a crank case or a structure of a scavenging passage to increase a scavenging efficiency, as in the techniques in Patent Literature 1, some structural objects need to be disposed in the crank case. Thus, the structure becomes complicated. Besides, in order to dispose the structural object, the volume in the crank case needs to be correspondingly increased. Therefore, the effect is not to a full extent.

Accordingly, it is challenging to adopt a simple structure to reduce the volume in a crank case and facilitate a scavenging efficiency.

The invention takes the issue into consideration and provides a solution to the issue.

Technical Means for Solving the Issue

To solve the issue, a structure as follows is adopted. A two-cycle engine of the invention includes a structure where, through descending of a piston, a mixed gas guided into a crank case is guided into a combustion chamber formed on an upper side of the piston through a scavenging passage. The crank case is disposed to a lower side of the piston performing a reciprocal up-down movement in a cylinder. In the two-cycle engine, a notch part is formed locally from a lower end side on a sidewall part of the piston sliding along an inner surface of the cylinder, the notch part is connected to the scavenging passage when the piston is located at a bottom dead center, a crank case protruding part is disposed in the crank case, and the crank case protruding part is located on a lower side of the scavenging passage and penetrates through the notch part and protrudes toward a central axis side of the cylinder when the piston is located at the bottom dead center. According to an embodiment of the invention, in the two-cycle engine, an uppermost part of the notch part is disposed closer to an upper side than a piston pin boss where a piston pin is installed in the piston. According to an embodiment of the invention, in the two-cycle engine, the notch part is disposed in a circumferential direction of the piston with interposition of a center of the piston pin boss, and two sides of the notch part with the center of the piston pin boss disposed therebetween are respectively connected with other adjacent scavenging passages. According to an embodiment of the invention, in the two-cycle engine, a connection part in the crank case protruding part between a surface on a central side and an upper surface of the cylinder is formed as a curved surface. According to an embodiment of the invention, in the two-cycle engine, an area of an inlet of the scavenging passage formed by the crank case protruding part and the notch part is 1.2 times to 4 times of an area of an opening of the scavenging passage in the combustion chamber when the piston is located at the bottom dead center. According to an embodiment of the invention, in the two-cycle engine, an extent to which the crank case protruding part protrudes from an outer circumference of the piston toward a central axis side of the piston is within a range of 10% to 35% of an outer diameter of the piston. According to an embodiment of the invention, in the two-cycle engine, a counter weight is fixed to a crank shaft, the crank shaft is disposed in the crank case and rotationally driven by the reciprocal up-down movement of the piston, and the crank case protruding part is formed by protruding toward an upper side of the counter weight when the piston is located at the bottom dead center.

According to an embodiment of the invention, in the two-cycle engine, an opening part not connected to the notch part is formed in the sidewall part, and when the piston is located at the bottom dead center, the opening part is connected with the scavenging passage. According to an embodiment of the invention, in the two-cycle engine, the opening part is formed closer to the upper side than the uppermost part of the notch part. According to an embodiment of the invention, in the two-cycle engine, the two-cycle engine is used as a power source. According to an embodiment of the invention, the engine work machine is a mower.

Inventive Effect

The invention is formed accordingly, and is thus able to reduce the volume in a crank case and facilitate a scavenging efficiency by adopting a simple structure.

DESCRIPTION OF THE EMBODIMENTS

Figure 1:
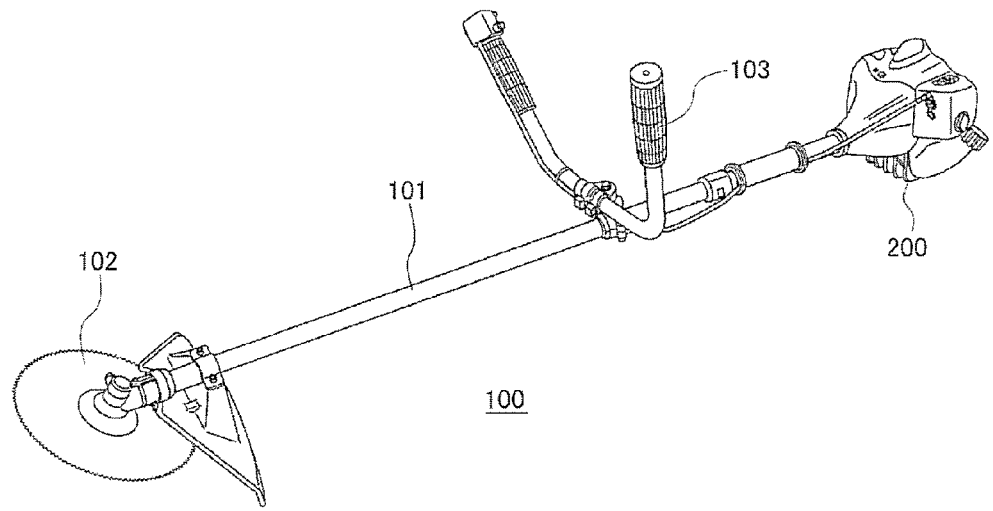
FIG. 1 is a perspective view illustrating an overall structure of a mower according to an embodiment of the invention.

In the following, a structure of an engine work machine (mower) as an embodiment of the invention is described. FIG. 1 is a perspective view illustrating a structure of a mower 100. In the mower 100, a rotatable blade 102 is disposed to a front end side (one end side) of an elongated operation rod 101 in a front-rear direction. The blade 102 is driven by an engine (not shown) in a power section 200 disposed to a rear end side (the other end) of the operation rod 101. Therefore, a transmission shaft (not shown) configured to transmit a rotational movement of the engine toward the front end side is disposed in the operation rod 101. At a proximity of a center in the front-rear direction of the operation rod 101, a holder 103 is disposed for the operator to grip during operation. A small-sized two-cycle engine is disposed in the power section 200.

Figure 2:
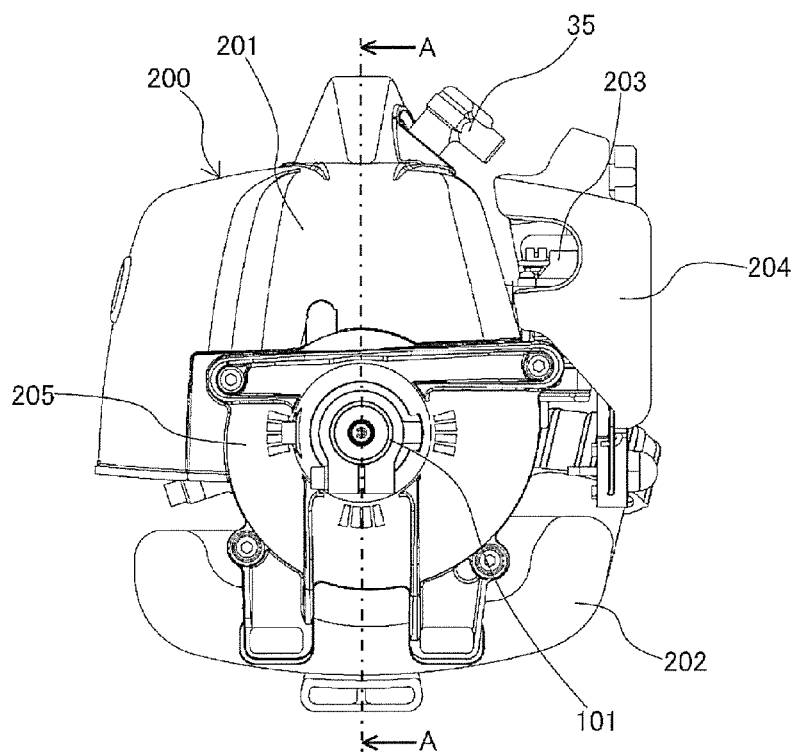
FIG. 2 is a front view illustrating a power section of the mower according to the embodiment of the invention.
Figure 3:
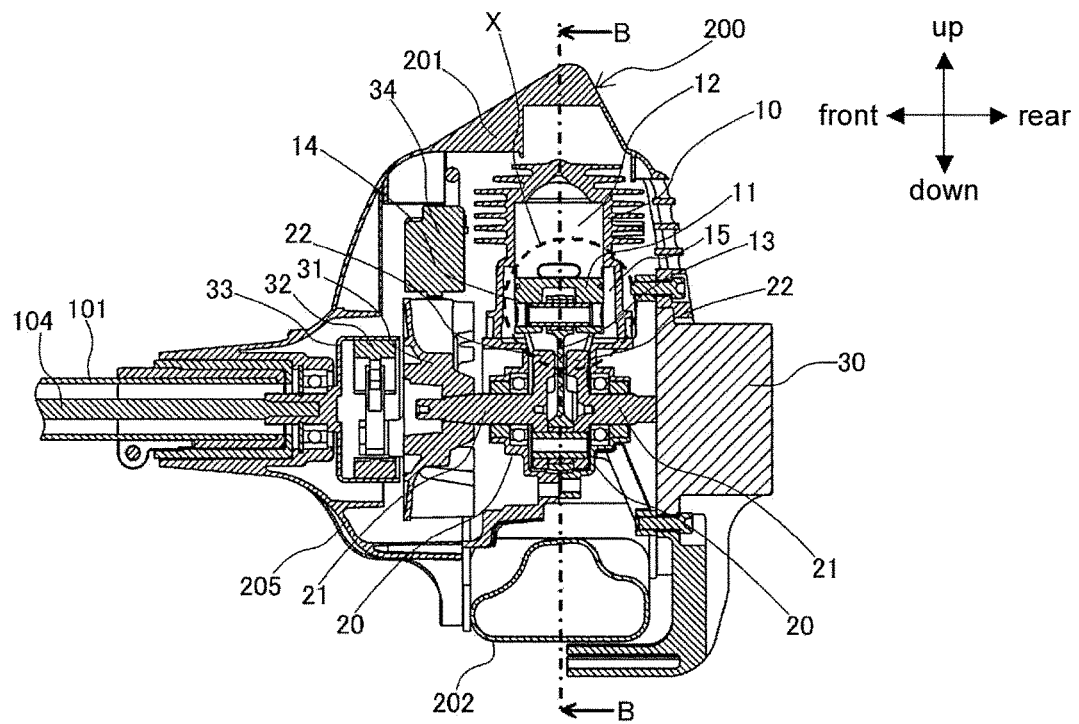
FIG. 3 is a cross-sectional view illustrating the power section of the mower according to the embodiment of the invention in an A-A direction.

FIG. 2 is a front view where the motion section 200 is observed from a front side. FIG. 3 is a cross-sectional view of the power section 200 along an A-A direction illustrating a cross-sectional structure of a crank shaft in the motion section 200. Here, a central axis of the crank shaft is located on an extended line of a central axis of the operation rod 101. As shown in FIG. 2, in the motion section 200, the engine (not shown in FIG. 2) is disposed inside a coverage of a cylinder cover 201. On a lower side of the motion section 200, a fuel tank 202 storing fuel is installed. The fuel is supplied from the fuel tank 202 to a vaporizer 203 disposed on a right side of FIG. 2. A mixed gas mixing the fuel and air guided into the vaporizer 203 by an air cleaner 204 is supplied to the engine. Besides, though omitted in the figure, on a left side of FIG. 2, a muffler allowing a waste gas to pass through is also installed to the engine. The muffler is also covered by a muffler cover integrally formed with the cylinder cover 201. Accordingly, a left-right direction in FIG. 2 becomes an intake-discharge direction. In FIG. 3, a cross-section perpendicular to the intake-discharge direction is shown. Besides, a cooling wind is generated in a fan case 205 installed to a front side of the engine. The cooling wind flows within the cylinder cover 201 to cool off components such as the engine or the muffler.

In the power section 200, the two-cycle engine is configured to be an engine serving as a power source, and has a feature in an internal structure of the engine. As shown in FIG. 3, the two-cycle engine is formed by assembling a cylinder 10 and a crank case 20. The cylinder 10 exhibits a configuration that a cooling fin is formed on a surface of a substantially cylindrical shape whose central axis is in an up-down direction. The crank case 20 is located on a lower side of the cylinder, and a crank shaft 21 is disposed in the crank case 20. In the cylinder 10, a piston 11 reciprocally moving in the up-down direction is disposed. On an upper side of the piston 11, a combustion chamber 12 is formed. An upper end side of a connection rod 13 is connected to an inner side of the piston 11 by means of a piston pin 14, and an lower end side of the connection rod 13 is connected to the crank shaft 21. Accordingly, the reciprocal up-down movement of the piston 11 is converted into a rotational movement of the crank shaft 21. To perform the operation smoothly, a counter weight 22, which is a poise, is fixed to the crank shaft 21. The crank case 20 is in a shape able to accommodate the crank shaft 21 where the counter weight 22 is fixed in a rotatable state. The counter weight 22 is also moved reciprocally with the reciprocal up-down movement of the piston 11. In a case when the piston 11 is located on the side of the bottom dead center, the counter weight 22 is located at an uppermost part of the piston 11.

Besides, in a case when the piston 11 is located at a proximity of the bottom dead center, the inside of the crank case 20 on the lower side of the piston 11 and the combustion chamber 12 on the upper side of the piston 11 are connected through a scavenging passage 15 formed in the cylinder 10. Accordingly, when the piston 11 descends, scavenging may be performed through the scavenging passage 15. FIG. 3 illustrates the state when the piston 11 is located on the side of the bottom dead center.

In addition, on the rear (right side of FIG. 3) of the crank shaft 21, a starting device 30 is installed. The starting device 30 is configured to force the crank shaft 21 to rotate, so as to start the engine. Besides, on the front (left side of FIG. 3) of the crank shaft 21, a cooling fan 31 and an eccentric clutch 32 are fixed. With rotation of the crank shaft 21, the cooling fan 31 generates the cooling wind. The cooling wind flows from the inside of the fan case 205 into the cylinder cover 201. Accordingly, components, such as the cylinder 10, that generate heat during operation are cooled off. Besides, an outer diameter of the eccentric clutch 32 may expand during high speed rotation. When the outer diameter is expanded, an inner surface of a clutch drum 33 disposed to cover the eccentric clutch 32 comes into contact with an outer circumference of the eccentric clutch 32. Accordingly, power transmission between the eccentric clutch 32 (crank shaft 21) and a transmission shaft 104 is controlled. The transmission shaft 104 is fixed to the clutch drum 33 and is coaxially disposed in the operation rod 101. Besides, a magnet (not shown) configured to generate electricity is fixed to the cooling fan 31. The electricity is generated through rotation of the magnet. A voltage of the electricity is boosted by an ignition coil 34, and supplied to a spark plug (not shown) covered by a spark plug cover 35 by means of a spark plug cord (not shown) at a suitable timing for ignition. Accordingly, the engine starts operating.

Figure 4:
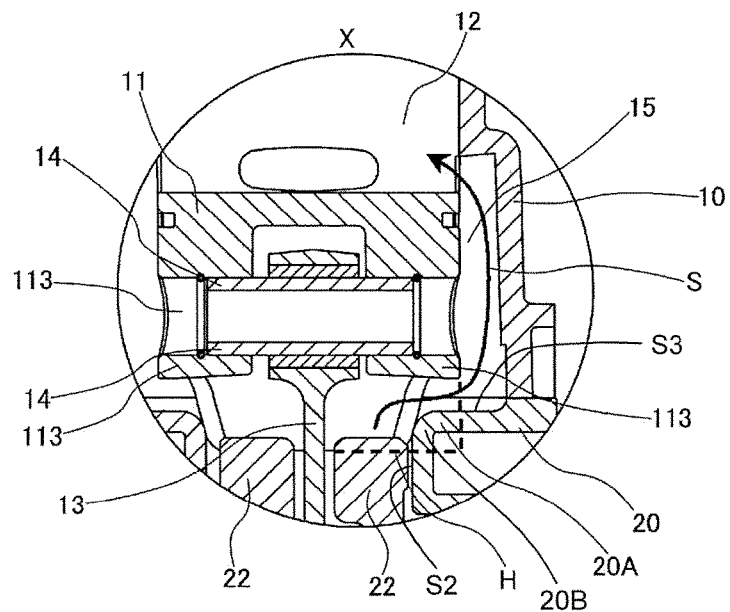
FIG. 4 is a partially enlarged cross-sectional view illustrating the power section of the mower according to the embodiment of the invention in the A-A direction.
Figure 5:
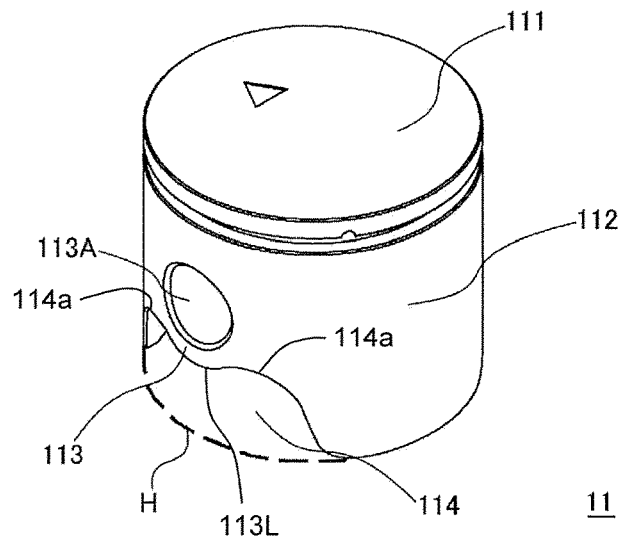
FIG. 5 is a perspective view illustrating a piston used in the embodiment of the invention.
Figure 6:
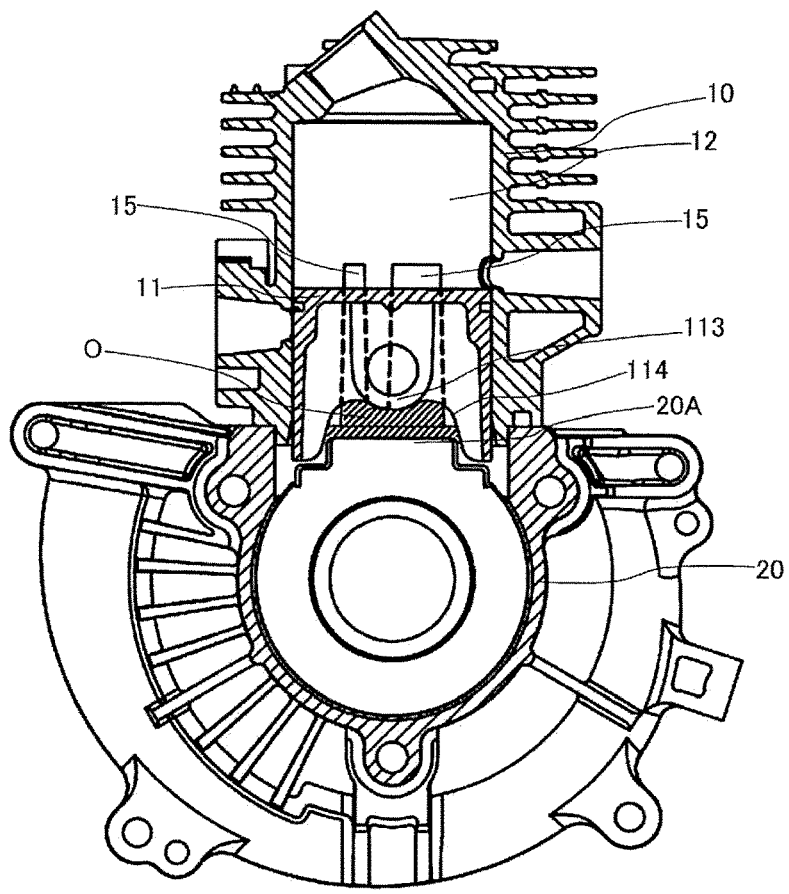
FIG. 6 is a cross-sectional view illustrating the power section of the mower according to the embodiment of the invention in a B-B direction.

The structure is the same as the structure of the conventional engine work machine. However, the engine is specifically designed to exhibit a feature in terms of a scavenging-related structure of a two-cycle engine. Details in this respect are described in the following. FIG. 4 is an enlarged view illustrating an area X surrounded by a broken line shown in FIG. 3. Also, FIG. 5 is a perspective view illustrating a shape of the piston 11 used herein. FIG. 6 is a cross-sectional view of the power section 200 observed in a B-B direction of FIG. 3. Similar to the above, in FIGS. 3, 4, and 6, the piston 11 is located on the side of the bottom dead center.

As shown in FIG. 5, the piston 11 used here includes a substantially circular piston upper surface 111 and a piston sidewall part (sidewall part) 112. The piston sidewall part (sidewall part) 112 has a side surface in a cylindrical shape with a diameter same as that of the piston upper surface 111, and slides along an inner surface of the cylinder 10. The piston pin 14 configured to connect the connection rod 13 penetrate through the piston sidewall part 112 in a lateral direction. Accordingly, in the piston sidewall part 112, piston pin bosses 113 configured to engage the piston pin 14 are disposed to two parts symmetrical in a diameter direction. FIGS. 3 and 4 illustrate a cross-sectional structure along a central axis of the piston pin 14 in a cylindrical shape, and FIG. 6 illustrates a cross-sectional structure perpendicular to the central axis. In addition, FIG. 6 illustrates a state where structural elements of the piston 11, the cylinder 10, and the crank case 20 are removed. In the piston pin boss 113, a circular hole part 113A is disposed for the piston pin 14 to penetrate through. In order to provide a high mechanical strength to support the piston pin 14, an inner side of a circumference of the hole part 113A of the piston sidewall part 112 is formed to be thicker.

Here, on a lower peripheral side of the piston pin boss 113 in the piston sidewall part 112, a notch part 114 formed by locally removing the piston sidewall part 112 is disposed at a lower end side. Namely, a part of the piston sidewall part 112 where the notch part 114 is disposed only extends toward a lower side to a proximity of the piston pin boss 113, whereas the piston sidewall part 112 excluding the part where the notch part 114 is disposed further extends toward the lower side (a side opposite to the piston upper surface 111). In FIG. 5, a shape of the piston sidewall 112 without the notch part 114 is represented as a piston outer circumference H. As shown in FIG. 5, an uppermost part 114a of the notch part 114 on two sides of the piston pin boss 113 is disposed to be closer to the upper side than a lower end 113L of the piston pin boss 113. The notch part 114 is disposed to a part connecting the scavenging passage 15 when the piston 11 is located at the lower end side. In a circumferential direction of the piston sidewall part 112, on two sides with a center of the piston pin boss 113 disposed therebetween, the notch part 114 is disposed to be closer to the upper side than the lower end of the piston boss 113, and the notch part 114 on the two sides is respectively overlapped and connected with other adjacent scavenging passages 15.

In FIG. 4, an arrow sign is used to indicate a mixed air flow (scavenging air flow) S from the crank case 20 to the combustion chamber 12. As shown herein, when the piston 11 is located on the side of the bottom dead center, at a part corresponding to the notch part 114 in the piston 11, an inner surface of the crank case 20 protrudes toward an interior side (a side where the central axis of the cylinder 10 is located), and forms a crank case first protruding part (protruding part) 20A penetrating toward the interior side through the notch part 114. Meanwhile, the crank case 20 at a part corresponding to a part without the notch part 114 in the piston 11 is not in a shape protruding toward the interior side. By assembling the piston 11 and the crank case 20 in such shapes, the piston 11 is able to reciprocally move up and down without interfering with the crank case 20. Here, by disposing the crank case first protruding part 20A, a volume in the crank case 20 is able to be reduced. To reduce the volume in the crank case 20 and perform scavenging smoothly, it is preferred that the crank case protruding part 20A is configured as follows. Namely, an extent to which the crank case protruding part 20A protrudes toward and overlaps with the side of the piston 11 with respect to an outer circumference of the piston 11 (a right end part of the piston outer circumference H in FIG. 4) is 10% to 35% of an outer diameter (radius) of the piston 11, and is 5% to 75% of a distance from the piston pin boss 113 to a lower end of the piston 11. Besides, a connection part 20B of the crank case protruding part 20A connecting a surface S2 of the crank case protruding part 20A on a central side of the cylinder 10 and an upper surface S3 of the crank case protruding part 20A is formed to be a gentle curved surface to guide the mixed gas to smoothly flow from inside of the crank case 20 toward the scavenging passage 15.

FIG. 6 illustrates a structure where a surrounding of the central axis of the cylinder 10 is changed by 90°. In the case when the piston 11 is located on the side of the bottom dead center, the scavenging passage 15 is connected with the crank case 20 through the notch part 114 on the lower side, and is connected to the combustion chamber 12 on the upper side. Accordingly, scavenging is performed through the notch part 114. Here, by disposing the notch part 114 on the piston sidewall part 112, an area (scavenging inlet O) of the scavenging passage 15 on the side of the crank case 20 is expanded, so as to facilitate a scavenging efficiency. In FIG. 6, a part where the notch part 114 and the scavenging passage 15 overlap is the scavenging inlet O, and is represented by a hatching pattern. Specifically taking the scavenging efficiency into consideration, an area of the scavenging inlet O is greater than an area of an opening of the scavenging passage 15 in the combustion chamber 12, preferably by 1.2 times to 4 times of the area of the opening, when the piston 11 is located at the bottom dead center.

Under such circumstance, the uppermost part of the notch part 144 is configured to be a high position. Specifically, the notch part 114 is formed such that, on two sides of the piston pin boss 113, the uppermost part of the notch part 144 is at a position closer to the upper side than the lower end of the piston pin boss 113. Accordingly, the area of the scavenging inlet O is able to be further increased, thereby further facilitating the scavenging efficiency. Here, presence of the notch part 114 does not have a negative effect to the support of the piston pin boss 113 to the piston pin 14. Alternatively, the crank case first protruding part 20A may be formed closer to the upper side with respect to the notch part 114, so as to further reduce the volume in the crank case 20.

In the structure, the volume in the crank case 20 is reduced merely by disposing the notch part 114 in the piston 11, and configuring a shape of an inner surface of the crank case 20 to be able to accommodate the crank case first protruding part 20A. Namely, the scavenging efficiency is facilitated with a simple structure where the shape of the piston 11 or the crank case 20 is adjusted, and no new component is added.

Figure 7:
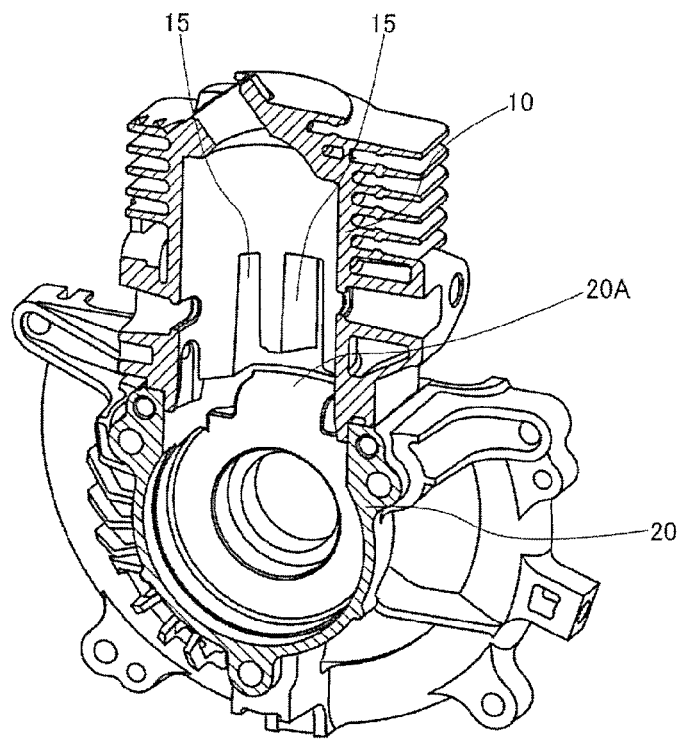
FIG. 7 is a perspective view illustrating an internal structure of a cylinder and a crank case used in the embodiment.

The piston 11 having the notch part 114 as shown in FIG. 5 is able to be manufactured easily through metal processing. Besides, FIG. 7 is a perspective view illustrating an internal structure of the crank case 20 having the crank case first protruding part 20A and the cylinder 10. The structure is able to be easily manufactured as long as the crank case first protruding part 20A is locally disposed to a lower side of the scavenging passage 15. Namely, the two-cycle engine is able to be manufactured easily.

Figure 8:
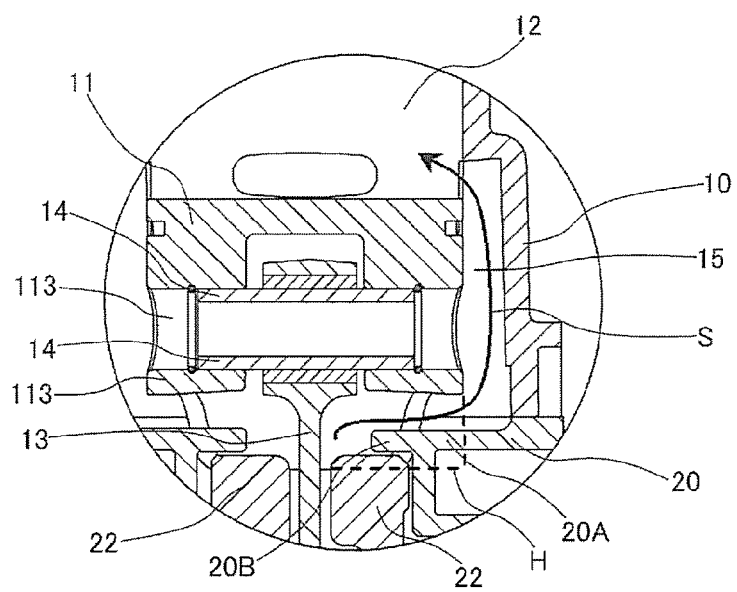
FIG. 8 is cross-sectional view where a part of the power section of a first example of variation of the embodiment of the invention is enlarged.

In the following, a first example of variation of the structure is described in the following. FIG. 8 is a cross-sectional view illustrating the structure of the first example of variation and corresponding to FIG. 4. In the structure, in addition to the crank case first protruding part 20A, a crank case second protruding part (protruding part) 20B extending to above the counter weight 22 is also disposed. FIG. 8 illustrates the state when the piston 11 is located at the side of the bottom dead center. Accordingly, the counter weight 22 is located at the uppermost part.

Even if the second crank case protruding part 20B shown in FIG. 8 is disposed, when the crank shaft 21 rotates, the crank case second protruding part 20B does not interfere with the piston 11 and the counter weight 22. Besides, by disposing the crank case second protruding part 20B, the volume in the crank case 20 is able to be further reduced. Clearly, the crank case 20 having the crank case second protruding part 20B is also able to be manufactured easily.

Moreover, by comparing the scavenging air flows S in FIGS. 4 and 8, it is clearly shown that the scavenging passage from inside of the crank case 20 to the combustion chamber 12 is further extended in the structure of FIG. 8, as the crank case second protruding part 20B is disposed. Therefore, since the crank case second protruding part 20B is disposed, a backflow of waste gas from the combustion chamber 12 toward inside of the crank case 20 during scavenging is further suppressed. Accordingly, more preferable engine properties are achieved.

Figure 9:
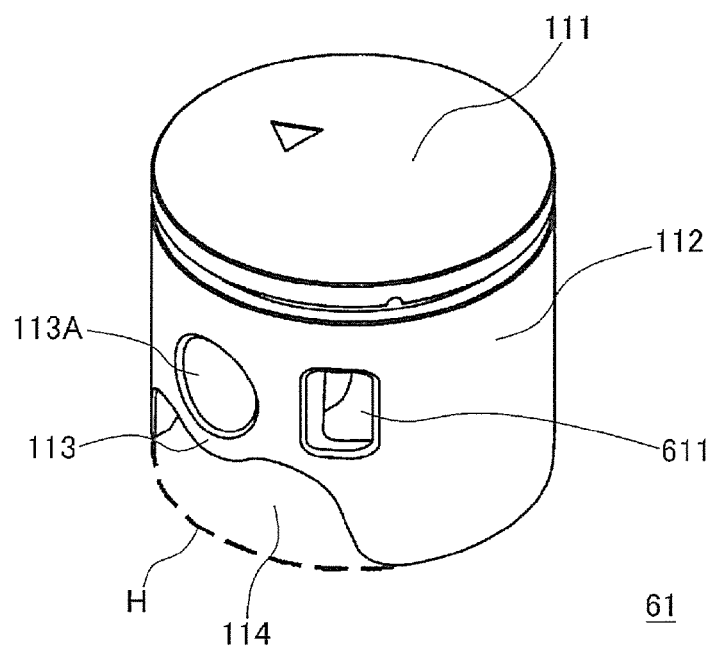
FIG. 9 is a perspective view illustrating a piston used in a second example of variation of the embodiment of the invention.
Figure 10:
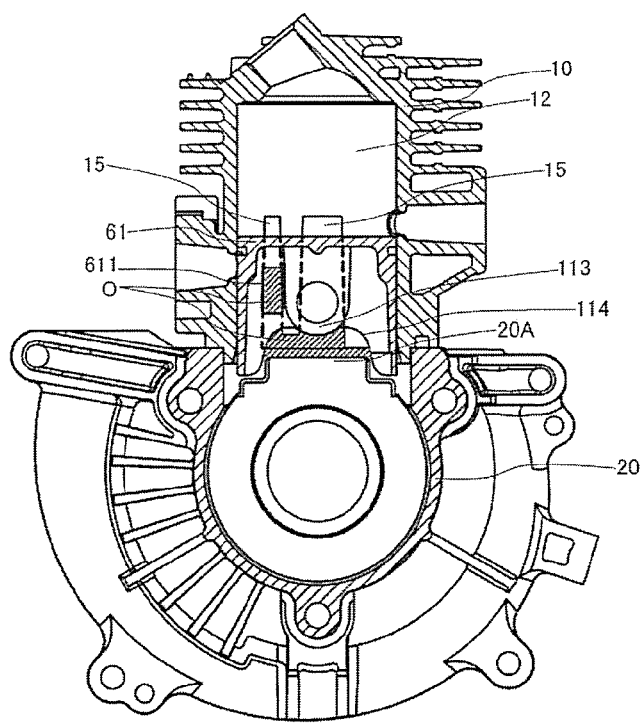
FIG. 10 is a cross-sectional view illustrating the power section of the second example of variation of the embodiment of the invention.

In the following, a second example of variation is described. FIG. 9 is a perspective view illustrating a piston 61 used herein, and is comparable to FIG. 5. FIG. 10 is a cross-sectional view illustrating a power section under such circumstance, and is comparable to FIG. 6. Similar to the piston 11, the piston 61 used herein also has the notch part 114 disposed to the piston sidewall part 112. However, in the piston 61, a piston opening part (opening part) 611 different from the notch part 114 is further disposed to the piston sidewall part 112. The piston opening part 611 may be disposed closer to the upper side than the uppermost part of the notch part 114.

As shown in FIG. 10, when the piston 61 is located on the side of the bottom dead center, the piston opening part 611 is disposed at a part overlapping with the scavenging passage 15. In FIG. 10, when the piston 61 is located on the side of the bottom dead center, the area of the scavenging passage 15 on the side of the crank case 20 (scavenging inlet O) is represented by a hatching pattern. Under such circumstance, by disposing the piston opening part 611, the area of the scavenging inlet O is able to be further increased, thereby further facilitating the scavenging efficiency.

Besides, regarding the structure, as long as the effect is able to be generated, the shapes and numbers of the notch part and the crank case protruding part are not limited. In the example, the crank case first protruding part and the crank case second protruding part serve as the crank case protruding parts. However, in the case that the piston is located on the side of the bottom dead center, any shape protruding toward the interior side (the central axis side of the cylinder) by penetrating through the notch part without interfering with the piston or the counter weight may serve as the crank case protruding part. Besides, the shape and number of the opening part are also not limited. Under such circumstance, it is clear that, by disposing the notch part or the opening part, the total weight of the piston is also reduced. Therefore, the engine is able to have a higher output or a lighter weight. The configuration or number of the scavenging passage may also be suitably set based on the notch part or the opening part. The shape of the crank case protruding part may also be set accordingly.

With a simple structure, the two-cycle engine with improved scavenging efficiency and output properties has a lighter weight and a higher output. Therefore, the structure is beneficial to a mower carried by the operator when being used. However, the structure is clearly beneficial to other engine work machine as well.

SYMBOL DESCRIPTIONS

10: cylinder
11, 61: piston
12: combustion chamber
13: connection rod
14: piston pin
15: scavenging passage
20: crank case
20A: crank case first protruding part (crank case protruding part)
20B: crank case second protruding part (crank case protruding part)
21: crank shaft
22: counter weight
30: starting device
31: cooling fan
32: eccentric clutch
33: clutch drum
34: ignition coil
35: spark plug cover
100: mower (engine work machine)
101: operation rod
102: blade
103: holder
104: transmission shaft
111: piston upper surface
112: piston sidewall part (sidewall part)
113: piston pin boss
113A: hole part
114: notch part
200: power section
201: cylinder cover
202: fuel tank
203: vaporizer 204: air cleaner
205: fan case
611: piston opening part (opening part)
H: piston outer circumference
O: inlet of scavenging passage
S: scavenging air flow

What is claimed is:

1. A two-cycle engine, comprising a structure where, through descending of a piston, a mixed gas guided into a crank case is guided into a combustion chamber formed on an upper side of the piston through a scavenging passage, wherein the crank case is disposed to a lower side of the piston performing a reciprocal up-down movement in a cylinder, wherein in the two-cycle engine,
 a notch part is formed locally from a lower end side on a sidewall part of the piston sliding along an inner surface of the cylinder, the notch part is connected to the scavenging passage when the piston is located at a bottom dead center, a crank case protruding part is disposed in the crank case, and the crank case protruding part is located on a lower side of the scavenging passage and penetrates through the notch part and protrudes toward a central axis side of the cylinder when the piston is located at the bottom dead center,
 wherein an uppermost part of the notch part is disposed closer to the upper side than a lower portion of a piston pin boss where a piston pin is installed in the piston, and the piston pin boss is an entire circular area supporting the piston pin.

2. The two-cycle engine as claimed in claim 1, wherein: the notch part is disposed that a center of the piston pin boss is interposed in a circumferential direction of the piston, and two sides of the notch part where the center of the piston pin boss is disposed therebetween are respectively connected with other adjacent scavenging passages.

3. The two-cycle engine as claimed in claim 1, wherein: an area of an inlet of the scavenging passage formed by the crank case protruding part and the notch part is 1.2 times to 4 times of an area of an opening of the scavenging passage in the combustion chamber when the piston is located at the bottom dead center.

4. The two-cycle engine as claimed in claim 1, wherein: an extent to which the crank case protruding part protrudes from an outer circumference of the piston toward a central axis side of the piston is within a range of 10% to 35% of an outer diameter of the piston.

5. The two-cycle engine as claimed in claim 1, wherein: a counter weight is fixed to a crank shaft, the crank shaft is disposed in the crank case and rotationally driven by the reciprocal up-down movement of the piston, and the crank case protruding part is formed by protruding toward an upper side of the counter weight when the piston is located at the bottom dead center.

6. The two-cycle engine as claimed in claim 1, wherein: an opening part not connected to the notch part is formed in the sidewall part, and when the piston is located at the bottom dead center, the opening part is connected with the scavenging passage.

7. The two-cycle engine as claimed in claim 6, wherein: the opening part is foimed closer to the upper side than an uppermost part of the notch part.

8. An engine work machine, wherein: the two-cycle engine as claimed in claim 1 is used as a power source.

9. The engine work machine as claimed in claim 8, wherein:
the engine work machine is a mower.

10. A two-cycle engine, comprising a structure where, through descending of a piston, a mixed gas guided into a crank case is guided into a combustion chamber formed on an upper side of the piston through a scavenging passage, wherein the crank case is disposed to a lower side of the piston performing a reciprocal up-down movement in a cylinder, wherein in the two-cycle engine,
 a notch part is formed locally from a lower end side on a sidewall part of the piston sliding along an inner surface of the cylinder, the notch part is connected to the scavenging passage when the piston is located at a bottom dead center, a crank case protruding part is disposed in the crank case, and the crank case protruding part is located on a lower side of the scavenging passage and penetrates through the notch part in a manner that a position in the axis direction of the cylinder is overlapped with the notch part and protrudes toward a central axis side of the cylinder when the piston is located at the bottom dead center,
 a connection part of the crank case protruding part connecting a surface of the crank case protruding part on a central side of the cylinder and an upper surface of the crank case protruding part is formed to be gentle curved surface.

* * * * *